US008700635B2

(12) United States Patent
Kinouchi et al.

(10) Patent No.: US 8,700,635 B2
(45) Date of Patent: Apr. 15, 2014

(54) ELECTRONIC DEVICE, DATA PROCESSING METHOD, DATA CONTROL METHOD, AND CONTENT DATA PROCESSING SYSTEM

(75) Inventors: Takashi Kinouchi, Tokyo (JP); Hideo Tsukazaki, Tokyo (JP); Kotaro Asaka, Tokyo (JP)

(73) Assignee: Sony Corporation, Tokyo (JP)

( * ) Notice: Subject to any disclaimer, the term of this patent is extended or adjusted under 35 U.S.C. 154(b) by 556 days.

(21) Appl. No.: 11/494,894

(22) Filed: Jul. 28, 2006

(65) Prior Publication Data

US 2007/0027926 A1 Feb. 1, 2007

(30) Foreign Application Priority Data

Aug. 1, 2005 (JP) ................. P2005-222934

(51) Int. Cl.
*G06F 7/02* (2006.01)
*G06F 17/30* (2006.01)
(52) U.S. Cl.
USPC ............................ 707/746; 707/805; 707/803
(58) Field of Classification Search
USPC ........ 707/104.1, 204, 999.104, 999.204, 803, 707/999.107, 999.102, 805, 741, 746; 725/115, 116, 133, 55; 463/43; 710/63
See application file for complete search history.

(56) References Cited

U.S. PATENT DOCUMENTS

| | | | | |
|---|---|---|---|---|
| 6,751,168 B2 * | 6/2004 | Yamada | ...................... | 369/30.23 |
| 7,080,103 B2 * | 7/2006 | Womack | ....................... | 707/202 |
| 2004/0032680 A1 * | 2/2004 | Fujiwara | ........................ | 360/15 |
| 2004/0128317 A1 * | 7/2004 | Sull et al. | ................... | 707/104.1 |
| 2004/0244047 A1 * | 12/2004 | Shinkai et al. | ................ | 725/115 |
| 2005/0091271 A1 * | 4/2005 | Srinivas et al. | ............ | 707/104.1 |
| 2006/0218187 A1 * | 9/2006 | Plastina et al. | ............. | 707/104.1 |
| 2006/0293964 A1 * | 12/2006 | Akihata | ......................... | 705/26 |
| 2007/0124794 A1 * | 5/2007 | Marko et al. | .................. | 725/135 |
| 2007/0162298 A1 * | 7/2007 | Melton et al. | ..................... | 705/1 |
| 2009/0193451 A1 * | 7/2009 | O'Neil | ............................ | 725/29 |

FOREIGN PATENT DOCUMENTS

| | | |
|---|---|---|
| EP | 1239480 A2 | 3/2002 |
| EP | 1211690 A2 | 6/2002 |
| EP | 1624446 A1 | 2/2006 |
| JP | 08-272864 | 10/1996 |
| JP | 10-234007 A | 9/1998 |
| JP | 2001-086458 A | 3/2001 |

(Continued)

OTHER PUBLICATIONS

Sony HDD audio player with a color LCD display appeared finally, Is the new UI "G-Sense" usable? Sony "VAIO pocket (VGF-AP1)", May 21, 2004, Weekly Device biking, Internet Reference, searched on Apr. 1, 2009, http://av.watch.impress.co.jp/docs/20040521/dev069.htm.

*Primary Examiner* — Bruce Moser
(74) *Attorney, Agent, or Firm* — Wolf, Greenfield & Sacks, P.C.

(57) ABSTRACT

An electronic device, data processing method, data control method, and content data processing system enabling a user to search for a track reproduced in the past, but with a forgotten title name and an artist name. A CPU displays on an LCD panel a reproduction history screen displaying a number of tracks reproduced that day on a calendar. By a user operation via an input device, the CPU switches the reproduction history screen to another reproduction history screen displaying a list of tracks reproduced on a certain other day as the reproduction history list. It reproduces the track selected by the user and allows editing of its attribute.

20 Claims, 11 Drawing Sheets

(56) References Cited

FOREIGN PATENT DOCUMENTS

| | | |
|---|---|---|
| JP | 2003-022655 A | 1/2003 |
| JP | 2003-084885 A | 3/2003 |
| JP | 2003-242038 A | 8/2003 |
| JP | 2004-007155 A | 1/2004 |
| JP | 2004-199741 A | 7/2004 |
| JP | 2004-229241 | 8/2004 |
| JP | 2004-336627 A | 11/2004 |
| WO | WO 02/095611 A2 | 11/2002 |
| WO | WO 2004/086356 A1 | 10/2004 |
| WO | WO 2004/086405 A1 | 10/2004 |
| WO | WO 2005/027512 A1 | 3/2005 |

* cited by examiner

FIG. 7

DISP4

| 12th(WED) ⇦ | 13th(THU) ⇨ | 14th(FRI) |
|---|---|---|
| 01: M_1 | ☐ | 3:06 |
| 02: M_2 | ☐ | 2:25 |
| 03: M_3 | ☐ | 3:38 |
| 04: M_4 | ☐ | 2:57 |
| 05: M_5 | ☐ | 3:17 |
| 06: M_6 | ☑ | 3:56 |
| 07: M_7 | ☐ | 2:34 |
| 08: M_8 | ☐ | 3:06 |
| 09: M_9 | ☐ | 4:13 |
| 10: M_10 | ☐ | 3:21 |
| 11: M_11 | ☑ | 3:30 |
| 12: M_12 | ☐ | 3:23 |
| 13: Those Sweet Words | | 3:12 |

DISP2c

| 12th(WED) | ◁ | 13th(THU) | ▷ | 14th(FRI) |

01: M_1　　　　　◀))　3:06
02: M_2　　　　　　　　2:25
03: M_3　　　　　　　　3:38
04: M_4　　　　　　　　2:57
05: M_5　　　　　　　　3:17
06: M_6　　　　　　　　3:56
07: M_7　　　　　　　　2:34
08: M_8　　　　　　　　3:06
09: M_9　　　　　　　　4:13
10: M_10　　　　　　　 3:21
11: M_11　　　　　　　 3:30
12: M_12　　　　　　　 3:23
13: Those Sweet Words　3:12

FIG. 11

LIST OF ATTRIBUTE DATA

| CONTENTS ID | TITLE | ALBUM NAME | GENRE NAME | ARTIST NAME | DELETE PLAN FLAG |
|---|---|---|---|---|---|
| Con_1 | Title_1 | Album_1 | Genre_1 | Artist_1 | ○ (WILL BE DELETED) |
| ... | ... | ... | ... | ... | |
| ... | ... | ... | ... | ... | |
| Con_6 | Title_6 | Album_6 | Genre_6 | Artist_6 | × |
| Con_10 | Title_10 | Album_10 | Genre_10 | Artist_10 | ○ |

ELECTRONIC DEVICE, DATA PROCESSING METHOD, DATA CONTROL METHOD, AND CONTENT DATA PROCESSING SYSTEM

CROSS REFERENCE TO RELATED APPLICATION

The present invention contains subject matter related to Japanese Patent Application No. 2005-222934 filed in the Japan Patent Office on Aug. 1, 2005, the entire contents of which being incorporated herein by reference.

BACKGROUND OF THE INVENTION

1. Field of the Invention

The present invention relates to an electronic device, data processing method, data control method, and content data processing system for preparing a reproduction list based on a reproduction history.

2. Description of the Related Art

In recent years, the increasingly greater capacity of recording media and advances made in technology for compression of music, movies, still images, etc. have enabled the development of portable storage/reproduction devices able to store enormous amounts of data and be carried around. Since the increasingly greater capacity of the devices has enabled large amounts of content data to be carried around, it has become difficult to find favorite content data from the content data. Various search methods have been devised to deal with this. As one such method, there can be explained the method of searching for track names, album names, and artist names of the content data by their initials. For more details, see Japanese Patent Publication (A) No. 2004-229241.

In such portable storage/reproduction devices using the above search method, however, there is the disadvantage that it is not possible to find a track whose name cannot be remembered, but was played in the past from among the large amount of content data. Further, in the portable storage/reproduction device using the above search method, there is the disadvantage that a favorite track or a track to be deleted cannot be found from among the tracks which were reproduced in the past. Further, in the conventional portable storage/reproduction device, there are the disadvantages of a very large load when deleting stored content data, the load causing the currently reproduced content to skip, and the operation time to become shorter. Further, when deleting content in the portable storage/reproduction device, there is the disadvantage that the deleted content remains in the reproduction history list etc., therefore it is hard to discriminate which tracks have been deleted and which tracks remain.

SUMMARY OF THE INVENTION

In order to overcome the above disadvantages, it is desirable to provide an electronic device, a data processing method, data control method, and content data processing system enabling a user to manager a list of tracks reproduced in the past as a reproduction history list in units of predetermined time intervals. Further, in order to counter the above disadvantages, it is desirable to provide an electronic device, a data processing method, data control method, and content data processing system enabling a user to bookmark, rate, or delete each track while viewing the reproduction history list. Further, in order to counter the above disadvantages, it is desirable to provide an electronic device, a data processing method, data control method, and content data processing system enabling a user to prepare a scheduled deletion list without actually deleting track data and make an external computer delete the tracks of the scheduled deletion list when connecting the device to the external computer. Further, in order to counter the above disadvantages, it is desirable to provide an electronic device, a data processing method, data control method, and content data processing system enabling a user to delete track data and display deleted track data distinguished from undeleted track data when displaying the reproduction history list.

According to an embodiment of the invention, there is provided an electronic device including a reproduction unit configured to reproduce content data; a storage unit storing the data; and a control unit configured to manage reproduction history data of content data in the reproduction unit in units of predetermined time intervals and make the storage unit store the reproduction history data of the predetermined time intervals.

Preferably, the electronic device further includes a display for displaying the reproduction history data, and the control unit makes the display display the reproduction history data when receiving an instruction for displaying the reproduction history data.

More preferably, the control unit makes a reproduction history screen included the reproduction history data display evaluation data for displaying evaluation of the content when receiving the instruction for displaying the reproduction history data and executes evaluation assigning processing based on input content when predetermined evaluation data is input based on an operation of the user.

More preferably, the evaluation data comprises a data indicating a rating, bookmark, or deletion of content.

More preferably, the control unit generates evaluation information based on an imparted evaluation and prepares a new reproduction list based on the evaluation information.

More preferably, the control unit makes the display display a calendar and, when a predetermined day is designated from the calendar, makes the display display the reproduction history data of that designated predetermined day.

More preferably, the control unit makes the display display the number of the content data reproduced on each predetermined day at a location corresponding to the predetermined day of the calendar and, when a predetermined date is designated from the calendar, makes the display display the reproduction history data of the designated predetermined day.

More preferably, the control unit generates the reproduction list data based on the reproduction history data read out from the storing means and selects the content data to be reproduced based on the reproduction list data.

More preferably, when making the display to display the reproduction history data, the control unit makes the display display attribute data of the content data for which a delete instruction has been received from the user on the screen displaying the reproduction history data so that it can be identified.

More preferably, the device further includes an interface for inputting and outputting data with between an external apparatus, and the control unit transfers the reproduction history data via the interface to the external apparatus.

According to a second embodiment of the invention, there is provided an electronic device including an interface configured to transfer data with an external apparatus; a storage unit storing the content data; a reproduction unit configured to reproduction the content data read out from the storage unit; and a control unit configured to transmit delete information indicating content data to be deleted via the interface to the external apparatus when detecting a connection with the external apparatus via the interface.

According to a third embodiment of the present invention, there is provided a data processing method including the steps of: reproducing content data, managing reproduction history data of the content data in units of predetermined time intervals, and storing the reproduction history data of the predetermined time intervals.

Preferably, the method further includes displaying the reproduction history data when receiving an instruction for displaying the reproduction history data.

Preferably, the method further comprises displaying evaluation data for displaying an evaluation of content on a reproduction history screen included the reproduction history data when receiving an instruction for displaying the reproduction history data and executing evaluation assigning processing based on the input content when predetermined evaluation data is input based on an operation of a user.

More preferably, the evaluation data comprises a data indicating a rating, bookmark, or deletion of content.

More preferably, the method further includes generating evaluation information based on the assigned evaluation and preparing a new reproduction list based on the evaluation information.

More preferably, the method further includes displaying a calendar and, when a predetermined day is designated from the calendar, displaying the reproduction history data of the designated predetermined day.

More preferably, the method further comprises displaying the number of the content data reproduced on each predetermined day at a location corresponding to the predetermined day of the calendar and, when a predetermined date is designated from the calendar, displaying the reproduction history data of the designated predetermined day.

More preferably, the method further includes generating the reproduction list data based on the reproduction history data and selecting the content data to be reproduced based on the reproduction list data.

More preferably, the method further includes, when displaying the reproduction history data, displaying attribute data of the content data for which a delete instruction has been received from the user on the screen displaying the reproduction history data so that it can be identified.

More preferably, the method further includes connecting with an external apparatus through and transferring the reproduction history data.

According to an embodiment of the invention, there is provided a data control method including selecting predetermined content data to be deleted and transmitting delete information indicating the content data to be deleted to an external apparatus via an interface when detecting connection with the external apparatus via the interface.

According to an embodiment of the invention, there is provided a content data processing system including a personal computer and a content player, wherein the content player is configured by an interface configured to transfer data with an external apparatus; a storage unit configured to store the content data; a reproduction unit configured to reproduction the content data read out from the storage unit; and a control unit configured to transmit delete information indicating content data to be deleted via the interface to the personal computer when detecting connection with the personal computer via the interface.

According to the present invention, therefore, there are provided an electronic device, data processing method, data control method, and content data processing system enabling a user to manage a list of tracks reproduced in the past as a reproduction history list in units of predetermined time intervals. Further, according to the present invention, there are provided an electronic device, data processing method, data control method, and content data processing system enabling a user to bookmark, rate, and delete each track while viewing the reproduction history list. Further, according to the present invention, there are provided an electronic device, data processing method, data control method, and content data processing system enabling a user to prepare a scheduled deletion list without deleting the track data and making an external computer delete the tracks of the scheduled deletion list when connecting the device to the external computer. Further, according to the present invention, there are provided an electronic device, data processing method, data control method, and content data processing system enabling a user to delete track data and display deleted track data distinguished from undeleted track data when displaying the reproduction history list.

BRIEF DESCRIPTION OF THE DRAWINGS

These and other objects and features of the present invention will become clearer from the following description of the preferred embodiments given with reference to the attached drawings, wherein:

FIG. 7 is a diagram showing an example of a delete mode screen;

FIG. 9 is a diagram showing an example of the display of erased track data in a reproduction history screen;

FIG. 11 is a diagram showing an example of attribute data.

DESCRIPTION OF THE PREFERRED EMBODIMENTS

Preferred embodiments of the present invention will be described in detail below while referring to the attached figures.

First Embodiment

Below, a portable audio player of a first embodiment of the present invention will be explained. The music data of the present embodiment is an example of the content data of the present invention, an audio output circuit 12 of the present embodiment is an example of the reproduction unit of the present invention, an HDD 18 of the present embodiment is an example of the storage unit of the present invention, a CPU 14 of the present embodiment is an example of the control unit of the present invention, the reproduction history list of the present embodiment is an example of the reproduction history data of the present invention, a liquid crystal display (LCD) panel 13 of the present embodiment is an example of the display of the present invention, and the reproduction list data of the present embodiment is an example of the reproduction list data of the present invention.

Figure 1:
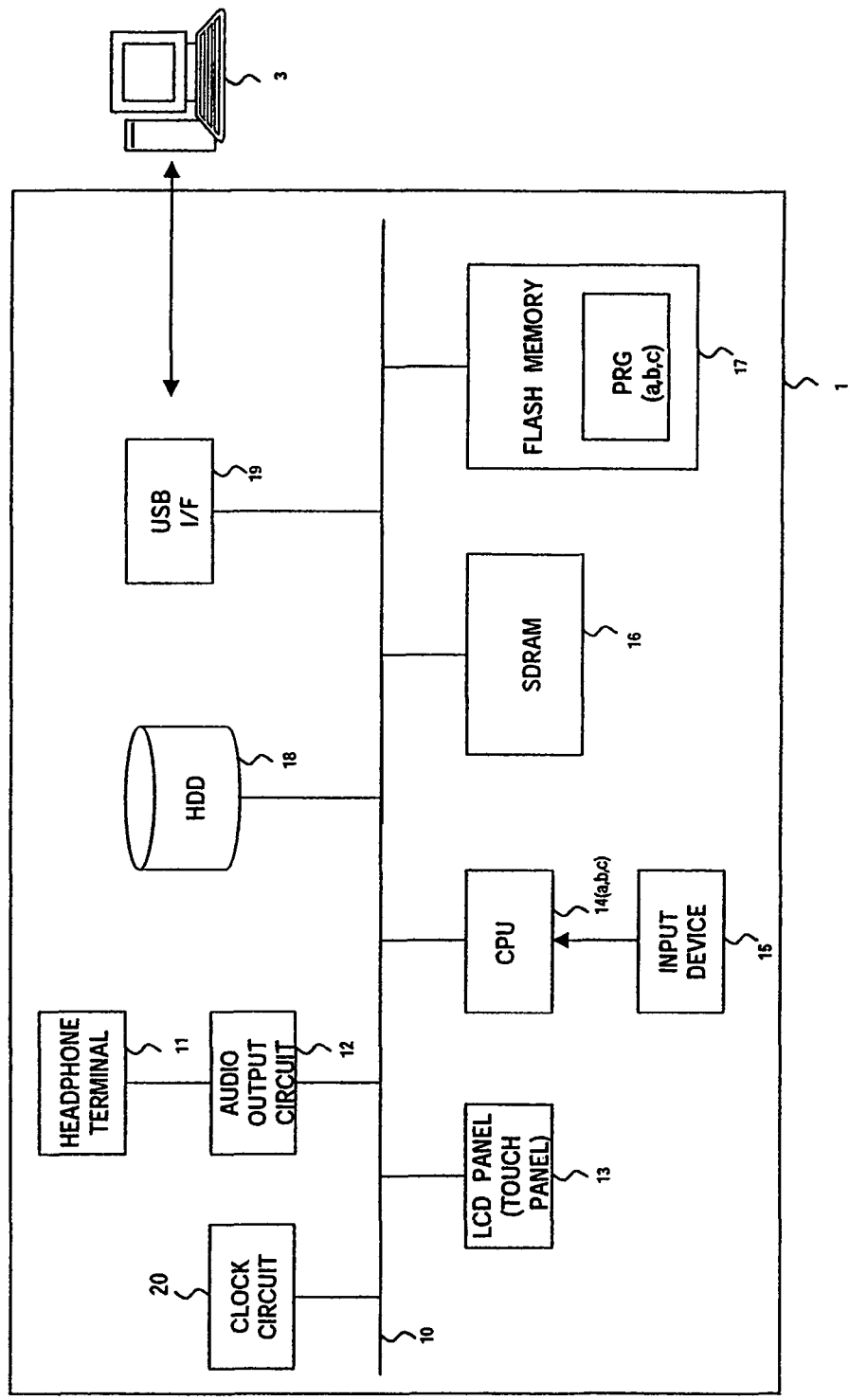
FIG. 1 is an overall view of the configuration of a portable audio player according to an embodiment of the present invention.

FIG. 1 is a view of the overall configuration of a portable audio player 1 according to an embodiment of the present invention. As shown in FIG. 1, the portable audio player 1 has for example a headphone terminal 11, audio output circuit 12, LCD panel 13, central processing unit (CPU) 14, input device 15, synchronous dynamic random access memory (SRAM) 16, flash memory 17, hard disk drive (HDD) 18, universal serial bus (USB) interface 19, and clock circuit 20 all connected via for example a data line 10.

The audio output circuit 12 outputs track data decoded by the CPU 14 in the form of an audio signal and reproduces the track via the headphone terminal 11. The LCD panel 13 is provided on for example the front surface of a case of the portable audio player 1. A variety of screens are displayed on it under the control of the CPU 14. The main screens displayed on the LCD panel 13 include for example a menu screen, track search screen, setup screen, reproduction screen, and reproduction history screen. These screens are switched by operation of the user via the input device 15. Further, the LCD panel 13 has for example a touch panel. A location on the screen touched by the user by his or her finger etc. is detected, and a detected location signal indicating the location is output to the CPU 14.

Figure 2C:
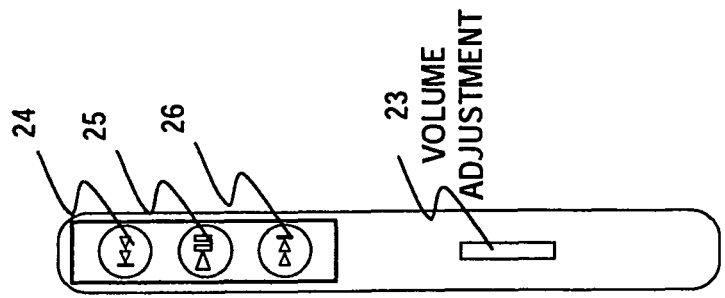
FIGS. 2A to 2C are views showing examples of side surfaces and a front surface of the portable audio player.
Figure 2B:
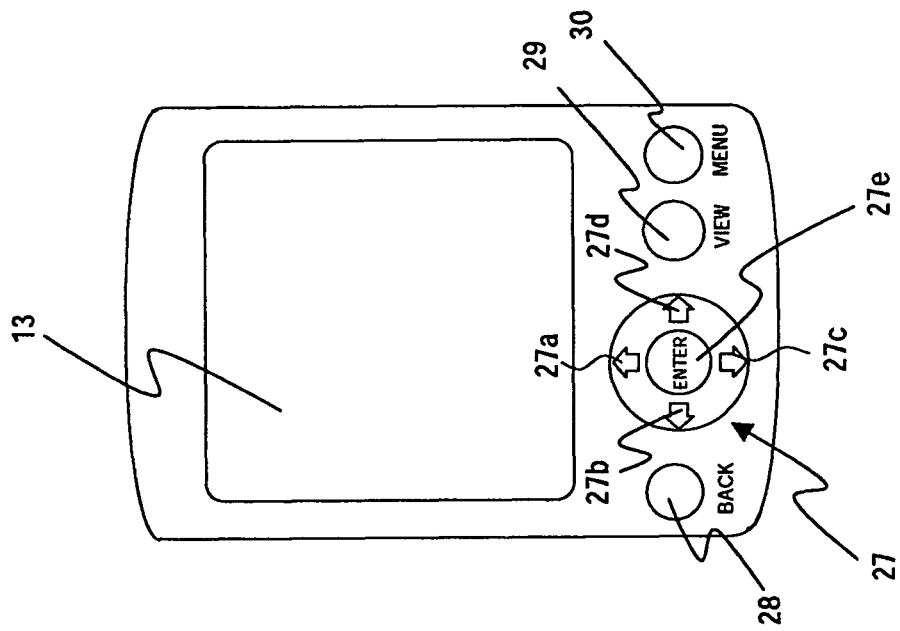
Figure 2A:
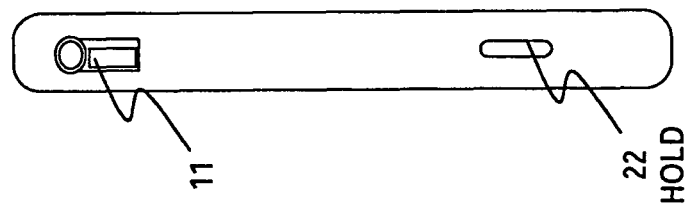

The input device 15 is. as shown in FIGS. 2A to 2C, configured as various keys provided on the case of the portable audio player 1 and operated by the user. Note that the input device 15 includes the touch panel of the LCD panel 13 explained above. FIGS. 2A to 2C are views showing example of the side surfaces and the front surface of the case of the portable audio player 1. That is, FIG. 2A and FIG. 2C are views showing examples of the side surfaces of the portable music player 1, while FIG. 2B is a view showing an example of the front surface of the portable music player 1.

As shown in FIG. 2A, one side surface of the portable music player 1 is provided with the headphone terminal 11 and a HOLD key 22. As shown in FIG. 2B, the front surface of the portable music player 1 is provided with the LCD panel 13, a cross key 27, a BACK key 28, a VIEW key 29, and a MENU key 30. The cross key 27 is configured by an up key 27a, a left key 27b, a down key 27c, a right key 27d, and an ENTER key 27e. As shown in FIG. 2C, the other side surface of the portable music player 1 is provided with a rewind key 24, a play pause key 25, a forwarding key 26, and a volume adjustment dial 23.

The SDRAM 16 temporarily stores the data etc. relating to the processing of the CPU 14. The flash memory 17 stores for example a program PRG for defining the operation of the CPU 14. The HDD 18 has a storage capacity of for example several gigabytes to several tens of gigabytes and stores content data compressed by various compression methods or uncompressed music data etc. The track data is written into the HDD 18 from the personal computer 3 via the USB interface 19. Further, the HDD 18 stores various reproduction lists prepared by the CPU 14.

The USB interface 19 is connected with the personal computer 3 and inputs/outputs data between the device and the personal computer 3. The data to be input and output here is for example track data, content data other than track data, and the reproduction history list explained later.

The clock circuit 20 is a circuit having a clock function and informs the CPU 14 of the present time etc. The CPU 14 prepares the reproduction history list etc. explained later based on the time information of the clock circuit 20.

The CPU 14 centrally controls the operation of the audio player 1 of the present embodiment based on the program PRG read out from the flash memory 17. Further, the CPU 14 decodes the track data selected by the user and outputs it to the audio output circuit 12.

Figures 3A, 3B:
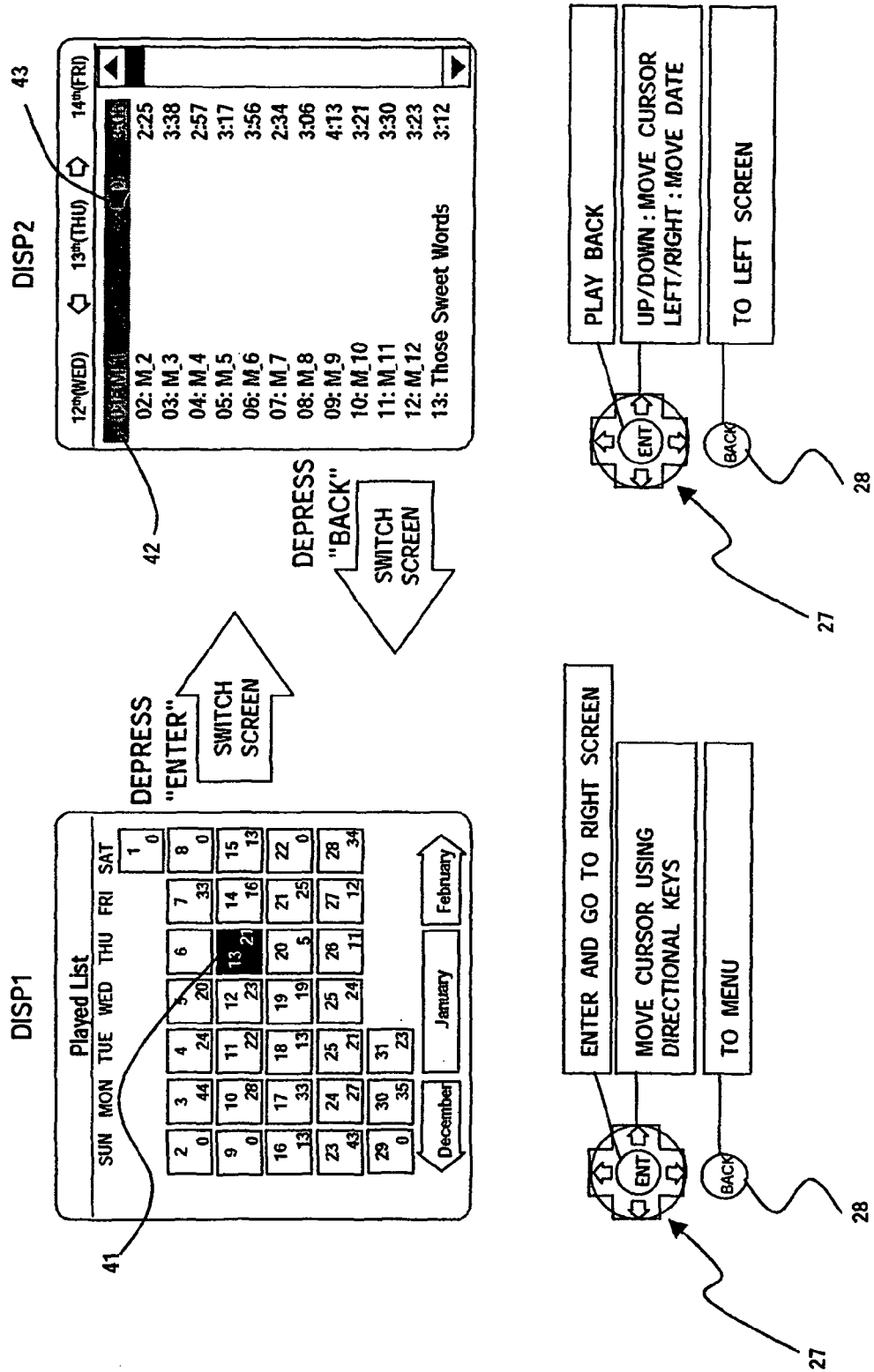
FIGS. 3A and 3B are views showing screens for displaying a list of the history of reproduction in the past.

The CPU 14 displays the history of the tracks reproduced in the past by the user on the LCD panel 13 as shown in for example FIG. 3A. FIGS. 3A and 3B are views showing the screen for displaying the history of reproduction in the past. FIG. 3A shows a reproduction history screen DISP1 for displaying a calendar and numbers of the track data reproduced on the different days and the key operation on the reproduction history screen DISP1. The upper numeral in each box in the figure shows the date, and the lower numeral shows the number of the track data reproduced in that day. FIG. 3B shows a reproduction history screen DISP2 for displaying the tracks reproduced on a certain specific day in the list state. M_1 to M_12 in the figure show titles of tracks reproduced in that day, arranged in the order of reproduction on that day, to form the reproduction history list. Further, the CPU 14 stores the reproduction history list as the reproduction list data in the HDD 18. Alternatively, the personal computer 3 may form a reproduction list of tracks reproduced in the past by a music player application and writes this into the HDD 18 as the reproduction list data. Here, for example, it is also possible for the CPU 14 to transmit the reproduction history list via the USB interface 19 to the external personal computer 3 and make it store the list or fetch the reproduction history list of another user acquired through the personal computer 3 into the portable audio player 1 via the USB interface 19 and perform the reproduction etc. by utilizing this list.

Next, the key operation on each screen will be explained. First, in the reproduction history screen DISP1, when depressing the cross keys 27a to 27d, the CPU 14 moves a cursor 41 in the directions to which the cross keys 27a to 27d correspond. When depressing the ENTER key 27e, the CPU 14 switches the screen to the reproduction history screen DISP2 of the date on which the cursor is placed at present. Further, when depressing the BACK key 28, the CPU 14 switches the screen to the MENU screen.

In the reproduction history screen DISP2, when depressing the up key 27a and the down key 27c, the CPU 14 moves the cursor 42 upward and downward. Further, the CPU 14 moves the date to the day before the day displayed at present when depressing the left key 27b, while moves the date to the next day when depressing the right key and switches the reproduction history list to be displayed to the list corresponding to the date. When depressing the ENTER key, the CPU reproduces the track data on which the cursor is placed at present and displays the play indicator 43 on the cursor 42. Further, when depressing the BACK key, the CPU 14 switches the reproduction history screen DISP2 at present to the reproduction history screen DISP1.

Figure 4:
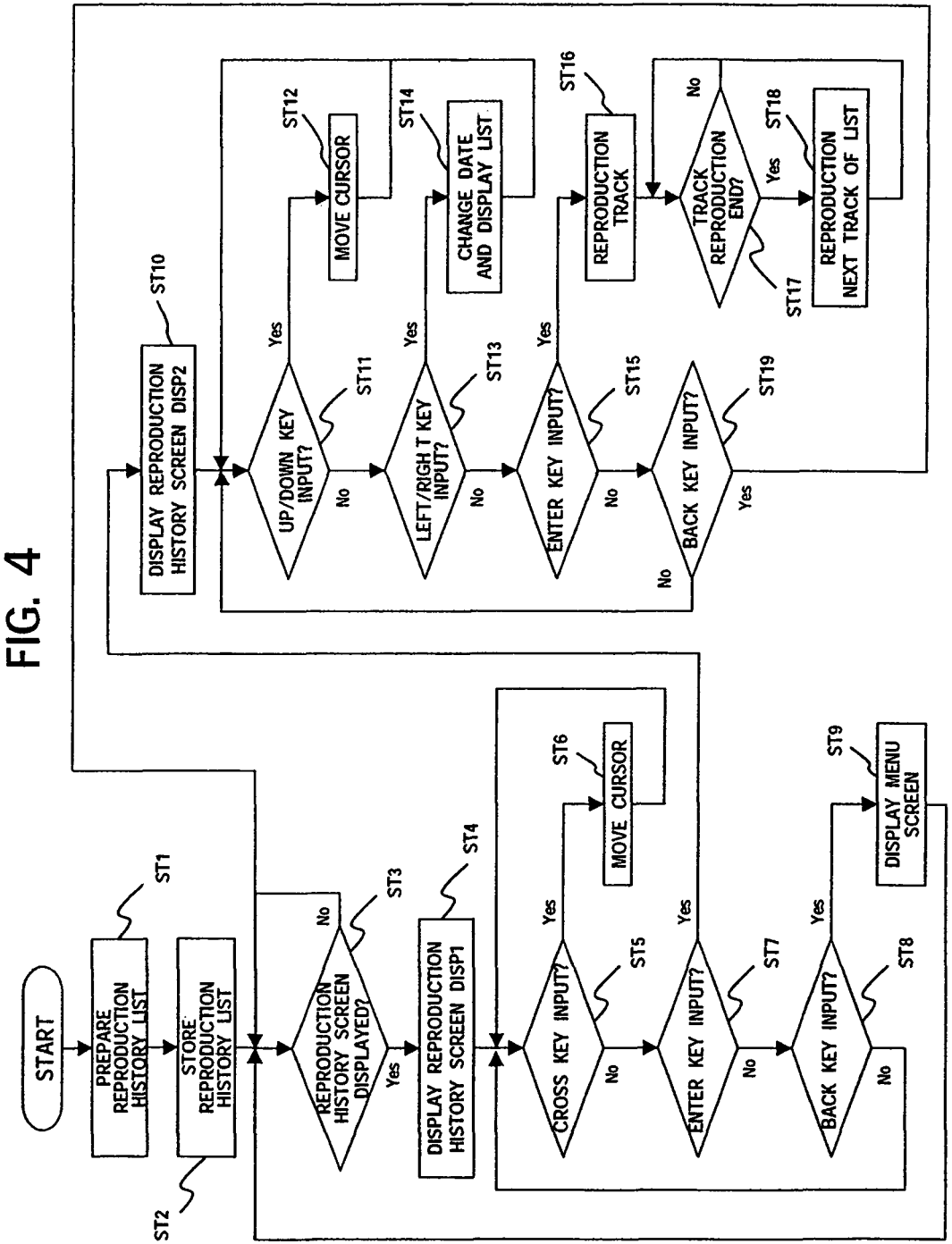
FIG. 4 is a flow chart showing an example of operation of the portable audio player.

Next, an example of the operation of the portable audio player 1 in the present embodiment will be explained. FIG. 4 is a flow chart showing the example of operation of the portable audio player 1.

Step ST1

The CPU 14 prepares a reproduction history list based on the reproduction history. Alternatively, the personal computer 3 forms a reproduction list of the tracks reproduced in the past by a music player application and writes this into the HDD 18 as the reproduction list data.

Step ST2

The CPU 14 makes the HDD 18 store the reproduction history list prepared at step ST1.

Step ST3

The CPU 14 judges whether or not the reproduction history screen DISP1 is to be displayed by the operation of the user and, when judging that the reproduction history screen DISP1 is to be displayed, proceeds to step ST4.

Step ST4

The CPU 14 displays the reproduction history screen DISP1 on the LCD panel 13.

Step ST5

The CPU 14 proceeds to step ST6 when there is an operation of the cross keys 27*a* to 27*d* by the user, while proceeds to step ST7 when there is no operation.

Step ST6

The CPU 14 moves the cursor 41 in the direction corresponding to the key operation according to the cross key operation of the user at step ST5.

Step ST7

The CPU 14 proceeds to step ST10 when there is an operation of the ENTER key 27*e* by the user, while proceeds to step ST8 when there is no operation.

Step ST8

The CPU 14 proceeds to step ST9 when there is an operation of the BACK key 27*e* by the user, while returns to step ST5 when there is no operation.

Step ST9

The CPU 14 displays the MENU screen, then returns to step ST3.

Step ST10

The CPU 14 displays the reproduction history screen DISP2, then proceeds to step ST11.

Note that, as will be explained in detail in the third embodiment, a track to be deleted is displayed by for example changing its color on the reproduction history screen DISP1.

Step ST11

The CPU 14 proceeds to step ST12 when there is an input of the up key 27*a* or the down key 27*c* of the cross key by the user, while proceeds to step ST13 when there is none.

Step ST12

The CPU 14 moves the cursor 41 according to the up/down key operation of the user, then returns to step ST11.

Step ST13

The CPU 14 proceeds to step ST14 when there is an input of the left key 27*b* or right key 27*d* of the cross key by the user, while proceeds to step ST15 when there is none.

Step ST14

The CPU 14 changes the date of the reproduction history list displayed according to the left/right key operation of the user and returns to step ST11.

Step ST15

The CPU 14 proceeds to step ST16 when there is an operation of the ENTER key 27*e* by the user, while proceeds to step ST19 when there is no operation.

Step ST16

The CPU 14 reproduces the music on which the cursor is placed, then proceeds to step ST17.

Step ST17

The CPU 14 judges whether or not the music being reproduced if finished. It proceeds to step ST18 when judging that the reproduction has ended, while continues the reproduction when judging that the reproduction has not ended.

Step ST18

The CPU 14 reproduces the next music of the reproduction history list being displayed.

Note that, as will be explained in detail in the third embodiment, the track to be deleted is described by changing its color in the reproduction history list, but not reproduced, skipped, and further next track of the list is reproduced.

Step ST19:

The CPU 14 returns to step ST4 when there is an operation of the BACK key 27*e* by the user, and returns to step ST11 when there is no operation.

As explained above, according to the audio player 1 of the present first embodiment, the history of the music reproduced in the past can be managed and displayed in units of days, therefore, a music which has been listened to in the past, but whose title name or artist name is not remembered can be found based on the reproduction history list. Note that the first embodiment explained the case where input was by key operation, but all operations may also be carried out from the touch panel of the LCD panel 13. Further, in the present embodiment, the reproduction history was managed in units of days, but this may be managed in units of time other than that, for example, in units of weeks/months, or may be divided between a.m. and p.m.

Further, in the present embodiment, the order of music in the reproduction list was the order of reproduction in the past, but the user may freely sort the music by the title name or sort them by the artist name.

Second Embodiment

Next, a portable audio player 1*a* of a second embodiment of the present invention will be explained. The present embodiment is an example of the second embodiment of the invention. A CPU 14*a* of the present embodiment is an example of the control unit of the present invention. According to the portable audio player 1*a* of the second embodiment, it becomes able to easily search for favorite track data of the user from among the track data reproduced in the past.

Figure 5:
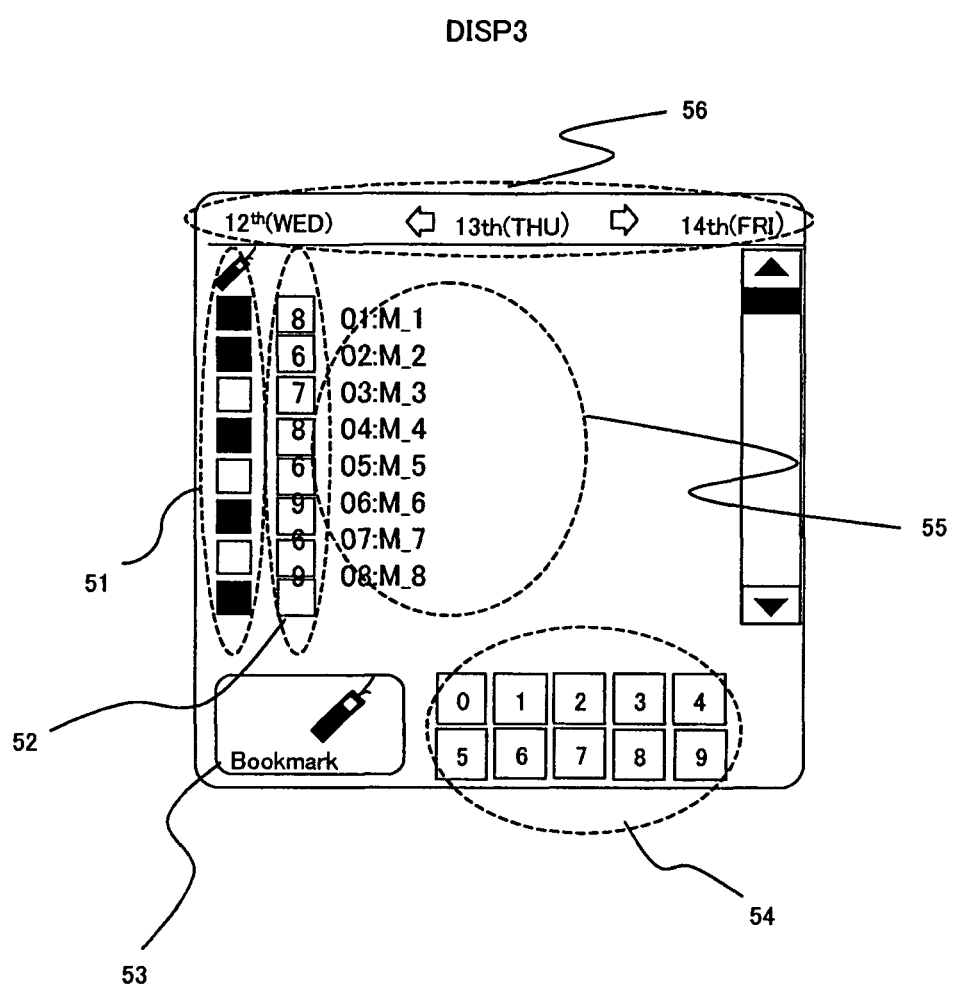
FIG. 5 is a diagram showing an example of a rating/bookmark screen.

The portable audio player 1*a* has the same configuration as that of the portable audio player 1 of the first embodiment except for the CPU 14*a* and the program PRGa stored in the flash memory 17. The CPU 14*a* of the portable audio player 1*a* reads out the program PRGa from the flash memory 17 and centrally controls the operation of the portable audio player 1*a*. The CPU 14*a* displays, for example, as shown in FIG. 5, the rating/bookmark screen DISP3 on the LCD panel 13. The rating/bookmark screen DISP3 is a screen switched to by mode switching etc. by for example the MENU button 30 from the reproduction history screen DISP2 of the first embodiment and is for rating/bookmarking based on the reproduction history list. Note that, the screen for this rating/bookmarking is an embodiment of the screen for evaluation of tracks based on the reproduction history list. It may also be used for setting the content data to be deleted other than for rating/bookmarking.

FIG. 5 is a view showing an example of the rating/bookmark screen DISP3. The rating/bookmark screen DISP3, as shown in FIG. 5, has a bookmark indicator 51, a rating indicator 52, a bookmark designation button 53, rating designation buttons 54, a track list 55, and a date indicator 56.

In the bookmark indicator 51, the boxes are linked with corresponding portions of the rating indicator 52 and the track list 55 displayed on the right and become ON when the user bookmarks tracks corresponding to certain specific boxes (for example, are lit up, blocked out, or checked). The rating indicator 52 indicates the rating of the user (ranking or scoring) with respect to the track related to the specific box.

The bookmark designation button 53 is a button for switching to the bookmark mode by a touch of the user. In the bookmark mode, a track to be bookmarked in the track list 55 can be bookmarked by being touched. At this time, the bookmark mode is not released even if one track is selected, so it is possible to continuously bookmark other tracks. Further, for example, by touching a portion other than the track list of the screen, the bookmark mode can be released.

The rating designation button 54 is configured by for example 10 buttons of from 0 to 9. By depressing any one button, the rating mode corresponding to the numeral of the depressed button is designated. In the rating mode, by touching the track to be rated in the track list 55, the score corresponding to the depressed button can be attached to that track. At this time, even if the track is once selected, the rating mode is not released, so it is possible to continuously attach the same score to the other tracks. The track list 55 is the reproduction history list of the first embodiment and is a reproduction history list corresponding to the date indicated by the date indicator 56. The date indicator 56 indicates the date to which the track list being displayed at present corresponds (date reproduced).

Further, the CPU 14a prepares a bookmarked music list comprised of bookmarked musics based on bookmarks attached in the bookmark mode and stores it in the HDD 18. Further, the CPU 14a prepares a rated music list collecting for example tracks having a specific score or more based on the ratings attached in the rating mode and stores it in the HDD 18. Further, the portable audio player 1a can transmit the information of the bookmarked and rated music, the bookmarked music list, and the rated music list to the personal computer 3 and receive for example bookmark and rating information, a bookmarked music list, and a rated track list of another user stored on the personal computer via the USB interface 19. Alternatively, other than the above method, it is also possible for the personal computer 3 to prepare a bookmark list or the rating list based on the bookmarks or ratings attached by the user in a music player application and write this as the reproduction list data into the HDD 18 via the USB interface 19.

Figure 6:
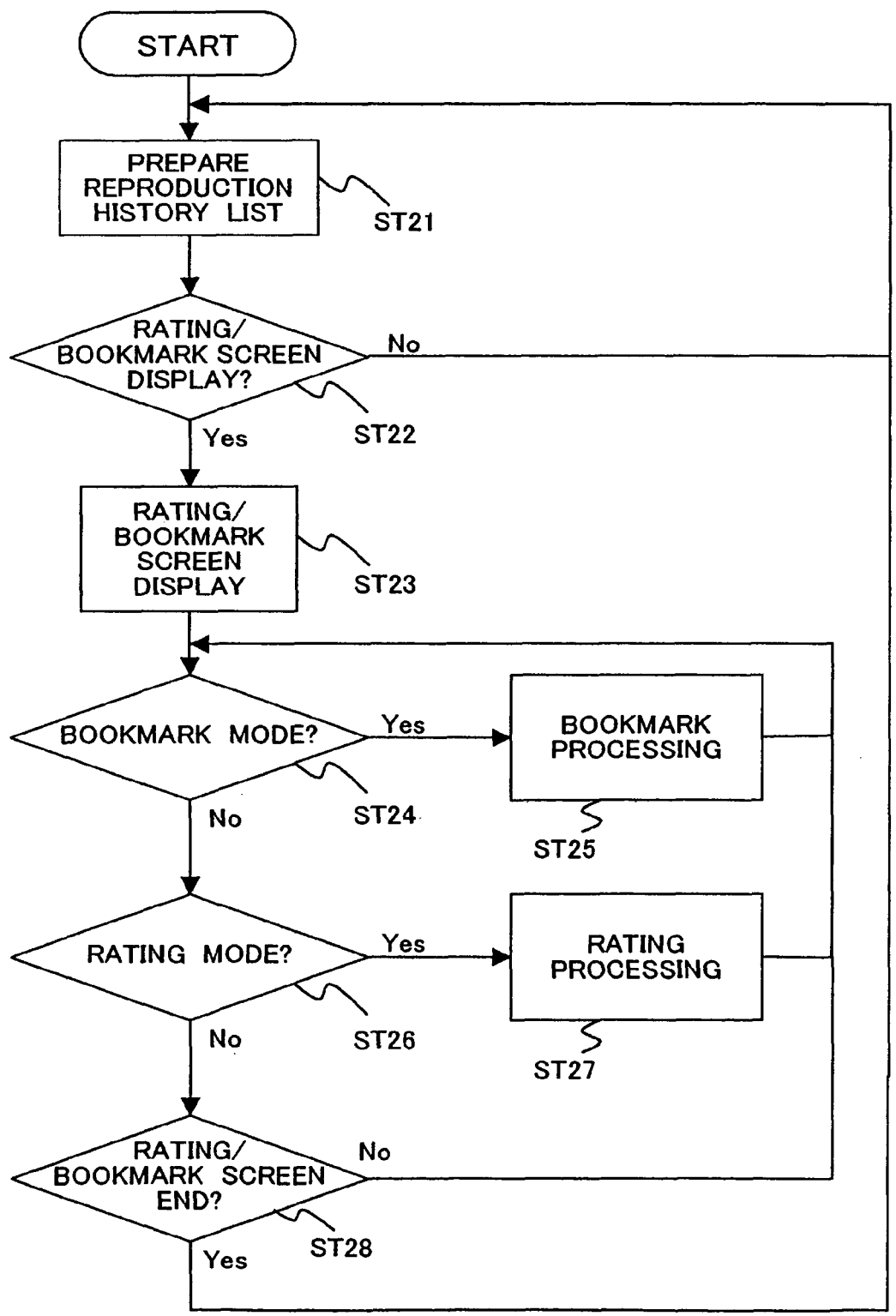
FIG. 6 is a flow chart showing an example of operation of another portable audio player.

Next, an example of the operation of the portable audio player 1a will be shown. FIG. 6 is a flow chart showing the example of operation of the portable audio player 1a.

Step ST21

The CPU 14a generates a reproduction history list. Alternatively, the personal computer 3 forms a reproduction list of music reproduced in the past by a music player application and writes this as the reproduction list data into the HDD 18.

Step ST22

The CPU 14a judges whether the rating/bookmark screen DISP3 is to be displayed according to the operation of the user when judging that this screen is to be displayed, then proceeds to step ST23.

Step ST23

The CPU 14a displays the rating/bookmark screen DISP3, then proceeds to step ST24.

Step ST24

The CPU 14a enters into the bookmark mode when the user depresses the bookmark designation button 53, then proceeds to step ST25. When the bookmark designation button 53 is not depressed, it proceeds to step ST26.

Step ST25

The CPU 14a performs the bookmark processing for bookmarking a corresponding music according to an operation of the user via the touch panel provided in the LCD panel 13. Further, the CPU 14a prepares a bookmarked music list comprised of bookmarked music based on the bookmarks attached in the bookmark processing and stores the same in the HDD 18. Alternatively, the personal computer 3 prepares a bookmarked music list based on the bookmarks attached by the user in the past by the music player application and writes this into the HDD 18.

Step ST26

The CPU 14a enters into the rating mode when the user depresses the rating designation button 54, then proceeds to step ST27. When the rating designation button 54 is not depressed, the CPU 14a proceeds to step ST28.

Step ST27

The CPU 14a performs rating processing for rating a corresponding track according to an operation of the user via the touch panel provided in the LCD panel 13, prepares a rating list, and stores it in the HDD 18. Alternatively, the personal computer 3 prepares a rating list based on the ratings attached by the user by the music player application and writes this into the HDD 18.

Step ST28

The CPU 14a judges whether or not the rating/bookmark screen DISP3 is to be terminated according to an operation of the user, proceeds to step ST22 when judging that this screen is to be terminated, while returns to step ST24 when judging that this screen is not to be terminated.

As explained above, according to the audio player 1a of the second embodiment, a track list of reproduction in the past is displayed, and the bookmark and rating operations can be directly carried out while viewing that reproduction history list. Therefore, the disadvantage of not being able to learn what kind of tracks the tracks are when rating or bookmarking them while viewing a list sorted by the artist names or album names can be eliminated. Note that, in the second embodiment, the case where all operations were carried out by a touch panel was explained, but all operations can be carried out by utilizing various types of keys as well.

Third Embodiment

The computer 3 of the present embodiment is an example of the computer of the present invention, while the scheduled deletion list of the present embodiment is an example of the delete information of the designated content data of the present invention. Next, a portable audio player 1b of a third embodiment of the present invention will be explained. According to the portable audio player 1b of the present embodiment, when deleting part or all of the track data stored in the HDD 18, the data can be deleted without applying any load upon the portable audio player 1b. The portable audio player 1b has the same configuration as that of the portable audio player 1 of the first embodiment except for a CPU 14b and a program PRGb.

The CPU 14b reads out the program PRGb from the flash memory 17 and centrally controls the operation of the portable audio player 1b. Further, the CPU 14b determines the music to be deleted by operation of the user on the reproduction history screen DISP2 and defines it as a scheduled deleted track. Further, the CPU 14b prepares a list comprised of scheduled deleted tracks, i.e., a scheduled deletion list, and stores this in the HDD 18.

A scheduled deleted track is specifically selected by the following method. For example, by entering into the delete mode during the display of the reproduction history screen DISP2, many scheduled deleted music can be continuously designated. For example, the MENU key 30 can be depressed on the reproduction history screen DISP2 to select and enter the delete mode.

FIG. 7 is a diagram showing an example of a delete mode screen DISP4. As shown in FIG. 7, the delete mode screen DISP4 includes a list of musics and scheduled deleted music check boxes 61 corresponding to the musics. The user can set a scheduled deleted music by checking the scheduled deleted music check box 61 of the music to be deleted. For example, when the scheduled deleted music is determined by the check operation of the user, the CPU 14 attaches a scheduled deleted music identifier for identifying that the music is a scheduled deleted music (scheduled deletion ID in FIG. 11) to a music determined as a scheduled deleted music. Due to this, the CPU 14 becomes able to recognize which musics are scheduled deleted musics. Note that the case of determining a scheduled deleted music on the reproduction history screen DISP2 was explained here, but the screen for determining the scheduled deleted music may also be another screen such as for example a reproduction screen, reproduction list edit screen, album list screen, genre sort list screen, and so on. Further, it is not only possible to determine the scheduled deleted musics one by one, but also possible to select the musics, for example for each album and each genre and put the entire whole album or genre in the scheduled deletion list.

Figure 8:
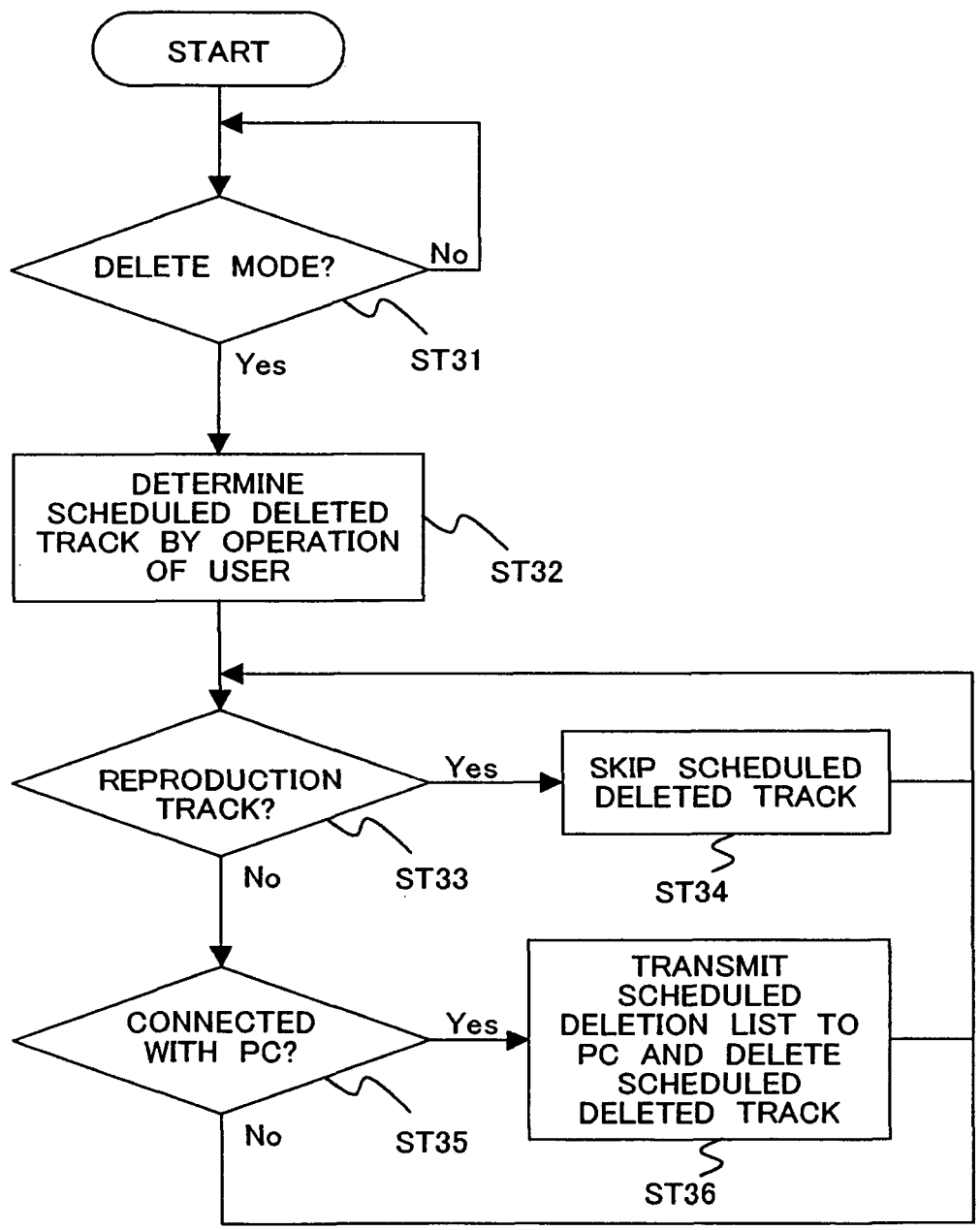
FIG. 8 is a flow chart showing an example of operation of another portable audio player.

Here, an example of operation of the portable audio player 1b will be explained. FIG. 8 is a flow chart showing the example of operation of the portable audio player 1b.

Step ST31

The CPU 14b judges whether or not it is to enter into the delete mode by an operation of the user and proceeds to step ST32 when judging that it is to enter into the delete mode.

Step ST32

The CPU 14b determines the music data selected on the delete mode screen DISP4 by the user as scheduled deleted musics and prepares the scheduled deletion list in which scheduled deleted musics are arranged in the order of selection.

Step ST33

The CPU 14b, according to the operation of the user, proceeds to step ST34 when track are to be reproduced, and proceeds to step ST35 in another case.

Step ST34

The CPU 14b skips scheduled deleted musics without playing them back at the time of the reproduction of the musics. Further, for example, in all track reproduction, random reproduction, and shuffle reproduction, the scheduled deleted musics are deemed out of the scope of reproduction and are skipped without reproduction.

Step ST35

The CPU 14b proceeds to step ST36 when the device is connected with the personal computer 3 via the USB interface 19, while returns to step ST33 in another case.

Step ST36

The CPU 14b transmits the scheduled deletion list to the personal computer 3. This scheduled deletion list includes at least the content identification data for identifying the delete target content. This scheduled deletion list is comprised of music tracks for which the scheduled deletion are set.

The personal computer 3 receiving the scheduled deletion list accesses the HDD 18 and deletes the scheduled deleted musics from the HDD 18 based on the scheduled deletion list. Due to this, the musics can be deleted without applying any load upon the portable audio player 1b. Further, the personal computer 3 regenerates the reproduction list of the portable audio player 1b omitting the deleted musics, for example, the reproduction history list, and stores it in the HDD 18.

As explained above, according to the portable audio player 1b of the present embodiment, the personal computer 3 may perform the heavy processing for deleting track data in place of the player. In this case, since the music tracks can be processed without applying any load upon the portable audio player 1b, the load of the CPU 14b is reduced. Therefore, the disadvantages of for example skipping occurring due to processing for deletion during the reproduction of content, a large amount of the battery power being consumed, and consequently the time for reproduction becoming short are eliminated. Further, at the time of the production of the portable audio player 1b, the CPU 14b per se can be made relatively low speed, so the production cost can be suppressed. Further, when deleting tracks, the processing of deleting the corresponding tracks from the reproduction list stored in the HDD 18, for example, the reproduction history list is carried out on the personal computer side, therefore no useless load is applied upon the CPU 14b of the portable audio player 1b, excess power consumption is suppressed, and quick delete processing may be possible.

Further, the portable audio player 1b may perform the processing for deleting music data. Note that the deletion of the track data disclosed here includes, other than the case of deleting the track data per se from the portable audio player 1b, a case where only the management data for managing the track data is deleted from the audio player 1b and further a case where the content data is transferred from the portable audio player 1b to the personal computer 3 thereby to obtain a state where no content data remains in the portable audio player 1b.

Note that, in the present embodiment, the delete processing is carried out via the personal computer 3 and the USB interface 19, but the present invention is not limited to this. For example, the delete processing may be carried out together with the server etc. distributing the music data via wireless communications such as a wireless LAN. When the delete processing is executed via wireless communications, the portable audio player 1b may be configured to be connected with the server or the personal computer 3 via a wireless public line network when detecting that the player enters a wireless communication area and then delete the scheduled deleted tracks. The judgment of the connection area with the public line network may be carried out according to whether or not a signal from a hot spot can be received. In this case, the scheduled deleted musics are previously selected, then the apparatus is connected with the personal computer 3 via the wireless public line network when the portable audio player 1b intrudes into the hot spot, and the processing of deleting the scheduled deleted track is executed.

Fourth Embodiment

Next, a portable audio player 1c of the fourth embodiment will be explained. According to the portable audio player 1c of the fourth embodiment, it is possible to delete the music data and display the music data which has been deleted in an easily understandable manner in the reproduction history list. The portable audio player 1c has the same configuration as that of the portable audio player 1 of the first embodiment except for a CPU 14c and a program PRGc.

The CPU 14c reads out the program PRGc stored in the flash memory 17 and centrally controls the operation of the portable audio player 1c. Further, the CPU 14c enters into the delete mode on for example the reproduction history screen DISP2 and deletes the music selected by the user from the HDD 18. Next, the CPU 14c, when displaying the reproduction history screen, displays by for example different colors, as shown in FIG. 8, the tracks whose data has been already deleted and no longer exists in the HDD 18, but which remain listed in the reproduction history list. FIG. 9 is a view showing an example of the display of the erased music data on a reproduction history screen DISP2c. As shown in FIG. 9, the deleted music (M_6 and M_11 in FIG. 8) are displayed by for example reversing white and black.

Figure 10:
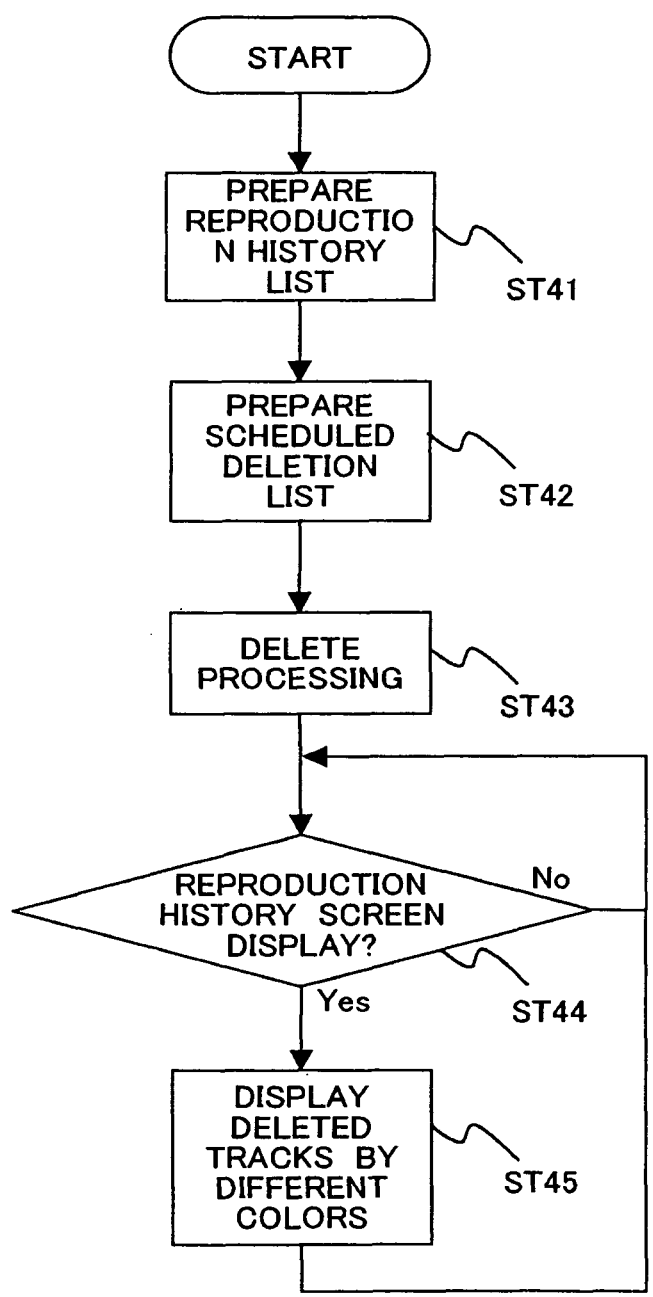
FIG. 10 is a flow chart showing an example of operation of another portable audio player.

Next, an example of operation of the portable audio player 1c will be explained. FIG. 10 is a flow chart showing the example of operation of the portable audio player 1c.

Step ST41

The CPU 14c prepares a reproduction history list.

Step ST42

The CPU 14c prepares a scheduled deletion list based on an operation of the user.

Step ST43

The CPU 14c deletes (erases) the track data of the tracks in the scheduled deletion list from the HDD 18.

Step ST44

The CPU 14c proceeds to step ST45 when judging that the reproduction history screen is to be displayed by an operation of the user.

Step ST45

The CPU 14c displays the tracks erased from the HDD 18 on the reproduction history screen DISP2c by black/white inversion.

Note that, the tracks are displayed here by black/white inversion, but may be displayed by for example another color or may be displayed by blinking. Further, the reproduction history screen may display the deleted tracks and the scheduled deleted tracks in an identifiable manner. For example, deleted tracks, scheduled deleted track, and tracks held by the portable audio player 1b may be displayed by different colors.

As explained above, according to the portable audio player 1c of the fourth embodiment, the deleted tracks can be displayed on the reproduction history list so that they can be seen at a glance, therefore, for example, when editing the reproduction list based on the reproduction history list, the disadvantage of an already deleted track being erroneously selected can be eliminated.

The present invention is not limited to the above embodiments. Namely, it should be understood by those skilled in the art that various modifications, combinations, sub-combinations, and alterations may occur depending on design requirements and other factors insofar as they are within the scope of the appended claims or the equivalents thereof. In the above embodiments according to the present invention, the LCD panel 13 was used as the display, but as the display, use may also be made of for example an organic EL display (organic electroluminescence display) panel.

Note that, in the above embodiments according to the present invention, further, the data is communicated via the personal computer 3 and the USB interface 19, but the present invention is not limited to this. For example, data communication can be carried out together with the server etc. distributing the track data via wireless communications such as infrared-ray communication and wireless LAN.

Further, in the above embodiments according to the present invention, the music data was explained as an example of the content data, but the present invention is not limited to this. The content data may be for example movies, still images, and text data. Further, the information displayed on the reproduction screen may include, other than that explained in the above embodiments, the title, main cast, director, genre, country, year of release, production company, distribution company, and so on in for example the case where the content data is moving picture data such as a movie. Further, when the content data is still image data such as photos, the information may include the date taken, size, type of photo (scene, picture etc.), and photographer. Further, when the content data is text data such as with electronic publishing, the information may include the title, author, genre, publishing company, and so on.

Further, in the above embodiments, the music data, that is, one of the content data, was stored in the HDD 18, but the present invention is not limited to this. Namely, the content data may also be stored in a flash memory etc.

Further, the above embodiments were explained with reference to a portable audio player as an example, but the present invention is not limited to this. It may be any electronic device storing content data, performing reproduction, and having a display function. For example, it may be an HDD recorder, electronic book terminal, DVD player, digital camera, or personal computer.

Further, in the above description, four embodiments were explained as independent embodiments, but the electronic device may have all of the functions explained in the four embodiments or may have any combination of them.

We claim:

1. An electronic device comprising:
a storage unit for storing content data;
a reproduction unit configured to reproduce the content data stored on the storage unit;
a control unit configured to manage reproduction history data of the content data in units of predetermined time intervals and instruct the storage unit to store the reproduction history data according to the predetermined time intervals; and
a display unit configured to display a user interface comprising a plurality of user-selectable portions, each of which corresponds to a different one of the predetermined time intervals;
wherein the content data comprises a plurality of tracks and the reproduction history data identifies which of the plurality of tracks were previously reproduced and when by the reproduction unit during the predetermined time intervals;
wherein the predetermined time intervals are unrelated to the content data;
wherein the reproduction history data includes information indicating a total number of the tracks that were reproduced by the reproduction unit in each of the predetermined time intervals; and
wherein the user-selectable portions of the user interface indicate the total number of tracks that were reproduced by the reproduction unit in the corresponding predetermined time interval.

2. An electronic device as set forth in claim 1, wherein the control unit instructs the display unit to display the reproduction history data when receiving an instruction to display the reproduction history data.

3. An electronic device as set forth in claim 2, wherein the control unit instructs the display unit to display evaluation data for evaluation of the content data when receiving the instruction to display the reproduction history data and assigns evaluation values to the content data based on predetermined evaluation data input by a user.

4. An electronic device as set forth in claim 3, wherein the evaluation data comprises data indicating a rating, bookmark, or deletion of the content data.

5. An electronic device as set forth in claim 3, wherein the control unit generates evaluation information based on the evaluation values assigned to the content data and prepares a new reproduction list based on the evaluation information.

6. An electronic device as set forth in claim 2, wherein the control unit instructs the display unit to display a calendar, and when a predetermined day is designated from the calendar, instructs the display unit to display the reproduction history data of the designated predetermined day.

7. An electronic device as set forth in claim 6, wherein the control unit instructs the display unit to display the content data reproduced on each predetermined day at a location corresponding to the predetermined day of the calendar, and when a predetermined day is designated from the calendar, instructs the display unit to display the reproduction history data of the designated predetermined day.

8. An electronic device as set forth in claim 2, wherein, upon instructing the display unit to display the reproduction history data, the control unit instructs the display unit to display attribute data for the content data for which a delete instruction has been received from the user so that the content data can be identified.

9. An electronic device as set forth in claim 1, wherein the control unit generates reproduction list data based on the reproduction history data read out from the storage unit and selects the content data to be reproduced based on the reproduction list data.

10. An electronic device as set forth in claim 1, wherein
the device further comprises an interface for inputting and outputting data with an external apparatus, and
the control unit transfers the reproduction history data via the interface to the external apparatus.

11. A data processing method comprising the steps of:
reproducing content data stored on an electronic device;
managing reproduction history data of the content data in units of predetermined time intervals;
storing the reproduction history data on the electronic device according to the predetermined time intervals; and
displaying a user interface comprising a plurality of user-selectable portions, each of which corresponds to a different one of the predetermined time intervals;
wherein the content data comprises a plurality of tracks and the reproduction history data identifies which of the plurality of tracks were previously reproduced and when by the reproduction unit during the predetermined time intervals;
wherein the predetermined time intervals are unrelated to the content data;
wherein the reproduction history data includes information indicating a total number of tracks that were reproduced by the reproduction unit in each of the predetermined time intervals; and
wherein the user-selectable portions of the user interface indicate the total number of tracks that were reproduced by the reproduction unit in the corresponding predetermined time interval.

12. A data processing method as set forth in claim 11, further comprising a step of displaying the reproduction history data when receiving an instruction for displaying the reproduction history data.

13. A data processing method as set forth in claim 12, further comprising a step of displaying evaluation data for evaluation of the content data when receiving an instruction for displaying the reproduction history data, and assigning evaluation values to the content data based on predetermined evaluation data input by a user.

14. A data processing method as set forth in claim 13, wherein the evaluation data comprises data indicating a rating, bookmark, or deletion of the content data.

15. A data processing method as set forth in claim 13, further comprising a step of generating evaluation information based on an assigned evaluation and preparing a new reproduction list based on the evaluation information.

16. A data processing method as set forth in claim 12, further comprising a step of generating reproduction list data based on the reproduction history data and selecting the content data to be reproduced based on the reproduction list data.

17. A data processing method as set forth in claim 11, further comprising a step of displaying a calendar, and when a predetermined day is designated from the calendar, displaying the reproduction history data of the designated predetermined day.

18. A data processing method as set forth in claim 17, further comprising steps of displaying a number of the content data reproduced on each predetermined day at a location corresponding to the predetermined day of the calendar, and when a predetermined day is designated from the calendar, displaying the reproduction history data of the designated predetermined day.

19. A data processing method as set forth in claim 18, further comprising the step of, when displaying the reproduction history data, displaying attribute data for the content data for which a delete instruction has been received from a user so that the content data can be identified.

20. A data processing method as set forth in claim 11, further comprising steps of connecting with an external apparatus and transferring the reproduction history data.

\* \* \* \* \*